United States Patent
Giacomelli et al.

(10) Patent No.: US 7,100,946 B2
(45) Date of Patent: Sep. 5, 2006

(54) BULKHEAD ASSEMBLY FOR USE IN PIPE-IN-PIPE SYSTEMS

(75) Inventors: Yvan Giacomelli, Aberdeen (GB); Jonathan Roland de Burgh Daly, Paris (FR)

(73) Assignee: Technip France SA, (FR)

( * ) Notice: Subject to any disclaimer, the term of this patent is extended or adjusted under 35 U.S.C. 154(b) by 29 days.

(21) Appl. No.: 10/493,197

(22) PCT Filed: Oct. 3, 2002

(86) PCT No.: PCT/GB02/04480

§ 371 (c)(1),
(2), (4) Date: Jul. 21, 2004

(87) PCT Pub. No.: WO03/033955

PCT Pub. Date: Apr. 24, 2003

(65) Prior Publication Data

US 2004/0245768 A1 Dec. 9, 2004

(30) Foreign Application Priority Data

Oct. 19, 2001 (GB) .................. 0125148.7

(51) Int. Cl.
*F16L 59/16* (2006.01)
*F16L 7/00* (2006.01)
*F16L 13/02* (2006.01)
*F16L 15/00* (2006.01)

(52) U.S. Cl. ............ 285/123.1; 285/47; 285/89; 285/92; 285/123.15; 285/288.1; 285/392

(58) Field of Classification Search .......... 285/47, 285/123.1, 123.15, 288.1, 89, 92, 392
See application file for complete search history.

(56) References Cited

U.S. PATENT DOCUMENTS

| 786,516 | A | * | 4/1905 | Phelan ............... 285/148.23 |
| 861,828 | A | * | 7/1907 | Grindrod et al. ...... 285/148.19 |
| 1,140,633 | A | * | 5/1915 | Trucano .................. 285/47 |
| 1,570,155 | A | * | 1/1926 | Karbowski ............... 285/328 |
| 1,707,087 | A | * | 3/1929 | Little ..................... 285/89 |
| 2,366,547 | A | * | 1/1945 | Oak ...................... 166/181 |
| 2,449,588 | A | * | 9/1948 | Clafford ................. 285/89 |
| 2,533,885 | A | * | 12/1950 | Hill ...................... 285/40 |
| 3,928,903 | A | * | 12/1975 | Richardson et al. ...... 29/407.1 |
| 3,943,618 | A | * | 3/1976 | Perkins ................. 29/407.1 |

(Continued)

FOREIGN PATENT DOCUMENTS

WO    WO 01 55630    8/2001

OTHER PUBLICATIONS

International Search Report dated Jan. 23, 2003.

*Primary Examiner*—James M. Hewitt
(74) *Attorney, Agent, or Firm*—Ostrolenk, Faber, Gerb & Soffen, LLP

(57) ABSTRACT

A bulkhead assembly for a pipe-in-pipe system includes coxially inner and outer components which are screwed together along a first threaded portion and a locking device which includes a locking element screwed onto a threaded portion on one of the components having threads running opposite to the threads on the first threaded portion. One of the components further includes a radially extending abutment shoulder at an end of the first threaded portion away from the second threaded portion which abuts against the other component.

5 Claims, 3 Drawing Sheets

U.S. PATENT DOCUMENTS

| | | | |
|---|---|---|---|
| 4,387,903 A * | 6/1983 | Smith | 277/634 |
| 4,400,019 A * | 8/1983 | Fruck | 285/55 |
| 4,415,184 A * | 11/1983 | Stephenson et al. | 285/47 |
| 4,538,834 A * | 9/1985 | Brady et al. | 285/10 |
| 4,635,967 A * | 1/1987 | Stephenson | 285/45 |
| 5,048,871 A * | 9/1991 | Pfeiffer et al. | 285/39 |
| 5,785,357 A * | 7/1998 | Foster et al. | 285/92 |
| 5,988,691 A * | 11/1999 | Cruickshank | 285/55 |
| 6,142,359 A | 11/2000 | Corbishley et al. | |
| 6,231,086 B1 | 5/2001 | Tierling | |
| 6,682,102 B1 * | 1/2004 | Betz | 285/123.15 |
| 2001/0012476 A1* | 8/2001 | Louis et al. | 405/168.2 |

* cited by examiner

-- Prior Art --

BULKHEAD ASSEMBLY FOR USE IN PIPE-IN-PIPE SYSTEMS

CROSS-REFERENCE TO RELATED APPLICATIONS

This application is based on and claims priority to International Application PCT/GB02/04480, filed Oct. 3, 2002, and to GB Application 0125148.7, filed Oct. 19, 2001, the entire disclosures of which are incorporated herein by reference.

BACKGROUND OF THE INVENTION

1. Technical Field of the Invention

This invention relates to a bulkhead assembly for use with double walled metal pipes, or "pipe-in-pipe" systems, for use in submarine pipelines.

2. Relevant Art

It is known to use double walled or "pipe-in-pipe" tubular members as submarine pipelines. An inner tube forms the actual flowline, while an outer tube defines an annular space between itself and the inner tube. The annular space is typically filled with an insulating material to reduce heat loss from fluid flowing in the pipeline.

It is usual to provide bulkheads in the form of annular members interconnecting the inner and outer tubes. These bulkhead are designed for transferring mechanical loads between the tubes during installation and operation. These loads can be laying loads (handling loads which have to be transferred to the inner pipe, for example) or service loads due to the effect of temperature of the transported liquid on the pipeline. Bulkheads are typically located at spacing of about 1 km, but these spacings can be reduced or increased according to the conditions of the particular application.

The general prior art in pipe-in-pipe systems provides bulkheads by means of a variety of forged or welded assemblies. Such prior art, and its disadvantages, are discussed in our published International Patent Application No WO 01/55630.

FIG. 1 shows another form of a bulkhead assembly devised by the present Applicant and forms one embodiment of the above International patent application. In FIG. 1, a double-walled rigid pipe 1 having a longitudinal axis A comprises an inner wall or tube 2 (the "flow pipe"), the diameter 16 at a thinner portion 14 of tube 2 and the material of which are chosen according to the nature, pressure and temperature of the fluid 5 to be carried, and an outer wall or tube (the "carrier pipe") with a diameter D which is slipped over the inner tube 2. A bulkhead assembly 10 essentially comprises an annular partition 11 having a width E fastened to the tubes 2 and 3. In the example shown, the annular partition 11 is in screw-threaded engagement with a thread 13 formed on a thickened portion 15 of the inner tube 2.

The arrangement shown in FIG. 1 shows an excellent mechanical performance, and is easy to produce and assemble. However, when pipeline is being laid a differential torque strain can be produced between the inner and outer tubes because of the difference between the trajectory of the laying vessel and the subsea path of the pipeline, due to environmental reasons such as waves and currents. Torque strains can also be induced by anisotropy of the material, or by the spooling on and off operations. This can produce the effect of unscrewing the threaded connection, which has two possible adverse consequences.

One is that the loads which the bulkhead transfers between the inner and outer tubes are transferred through the threaded portion, which suitably is of trapezoidal thread ACME type. Unscrewing of this portion can cause the number of threads that are engaged to be reduced and thus the maximum load to be reduced.

The other is that in cases where the bulkhead is also used to provide fluid containment, for example to provide a water containment when the external pipe is damaged, at least one end of the threaded portion is arranged to provide sealing, e.g. by way of welding or the inclusion of a sealing element. The unscrewing of the bulkhead can damage the integrity of the seal.

SUMMARY OF THE INVENTION

One object of the present invention is to overcome or mitigate the above problems.

The invention provides a bulkhead assembly for a pipe-in-pipe system, the assembly comprising an outer piece and an inner piece which can be screwed together along a first threaded portion, and further comprising a locking device, characterised in that the locking device comprises a locking element screwed on a second threaded portion having screw threads in a direction opposite to that of the first threaded portion.

Preferred features of the invention will be apparent from the appended claims.

BRIEF DESCRIPTION OF THE DRAWING(S)

Embodiments of the invention will now be described, by way of example only, with reference to the drawings, in which.

DETAILED DESCRIPTION OF PREFERRED EMBODIMENTS OF THE INVENTION

Figure 1:
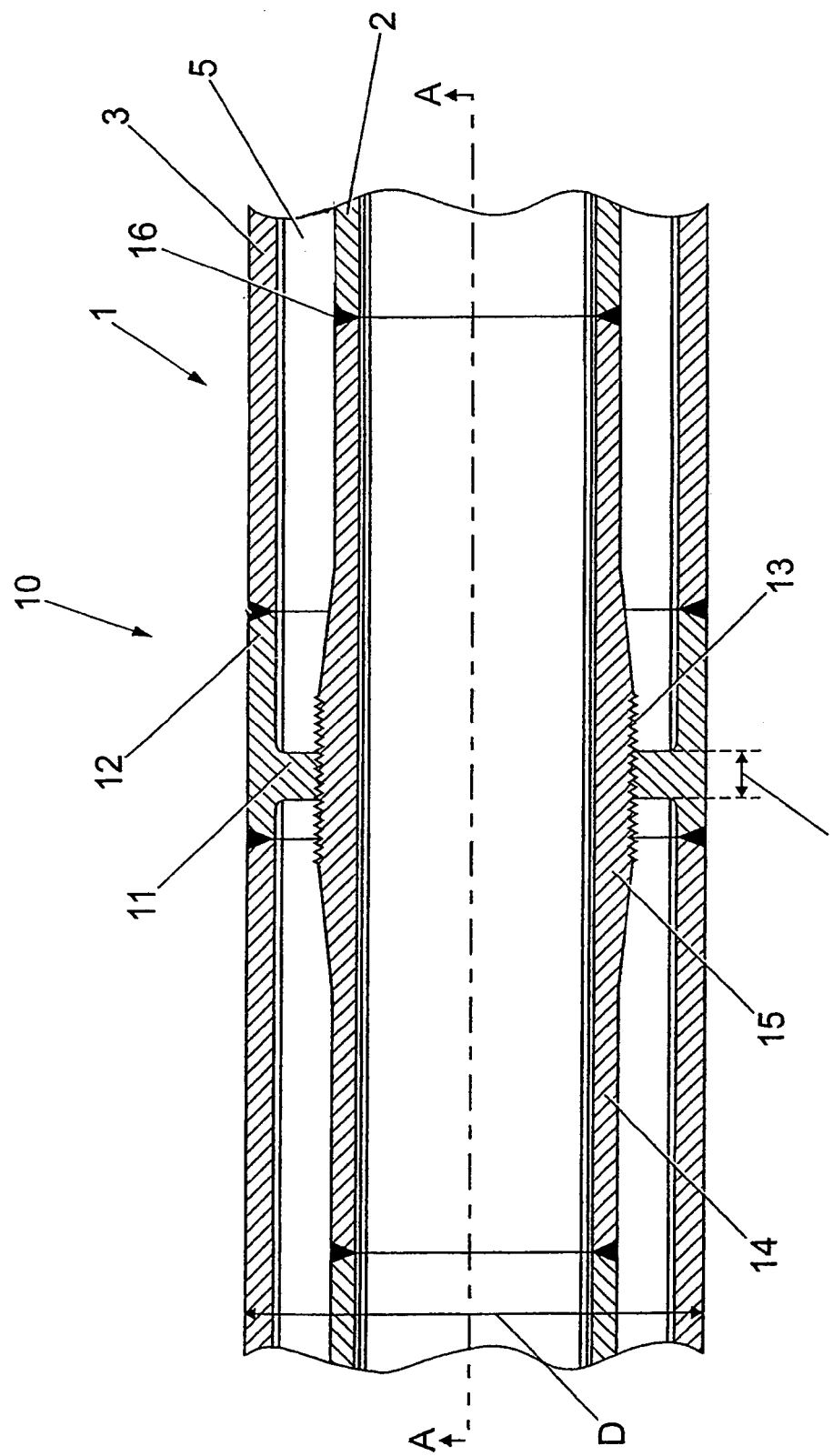
FIG. 1 illustrates a prior proposal, not forming part of the present invention, as discussed above.
Figure 2:
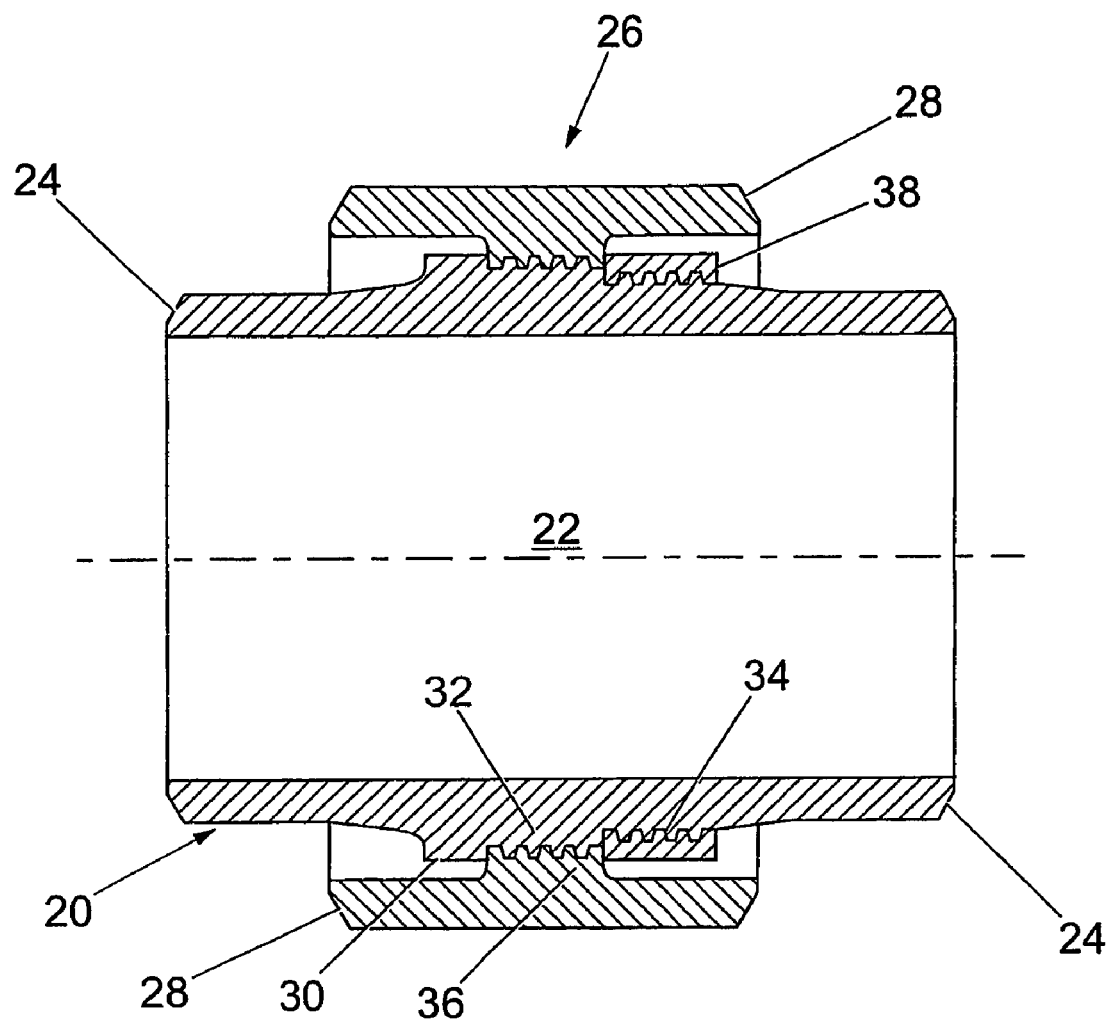
FIG. 2 is a cross-sectional view of a bulkhead assembly for a pipe-in-pipe system, forming one embodiment of the present invention.

Referring to FIG. 2, a bulkhead assembly is formed by a first tubular component 20 and a second tubular component 26. The first tubular component 20 has a through-bore 22 and is adapted to form part of an inner pipe by welding at weld bevels 24. The second component 26 is provided with weld bevels 28 by means of which it can be welded in an outer pipe.

The first component 20 has a thickened wall portion formed to provide a shoulder 30, a first threaded portion 32, and a second threaded portion 34. The first threaded portion 32 is formed as a right-handed screw thread. The second threaded portion 34 is formed as a left-handed screw thread having an outer diameter smaller than the root diameter of the first threaded portion 32.

The second component 26 has an internal annular bulkhead 36 the internal surface of which is formed as a screw thread complementary to the threaded portion 32. A locking ring 38 has an internal thread complementary to that of the second threaded portion 34.

It will be appreciated that the second component 26 is first engaged with and run up tight on the first threaded portion 32, and the locking ring 38 is then engaged with and run up tight on the second threaded portion 34. Since the screw threads are in opposite directions, the locking ring 38 prevents unscrewing of the outer pipe with respect to the inner pipe.

In a typical example, the outer diameter of the inner pipe is 219.1 mm (8 inch nominal), the outer diameter of the second component 26 is about 323.9 mm, and the threaded portions 32 and 34 have an approximate length of 30 mm, and a bulkhead assembly of this type will be included every 1 km or so in a pipeline. It will be appreciated that smaller or larger pipe sizes may be used, for example 254 mm (10 inch) diameter or 406.4 mm (16 inch) diameter may be used.

Figure 3:
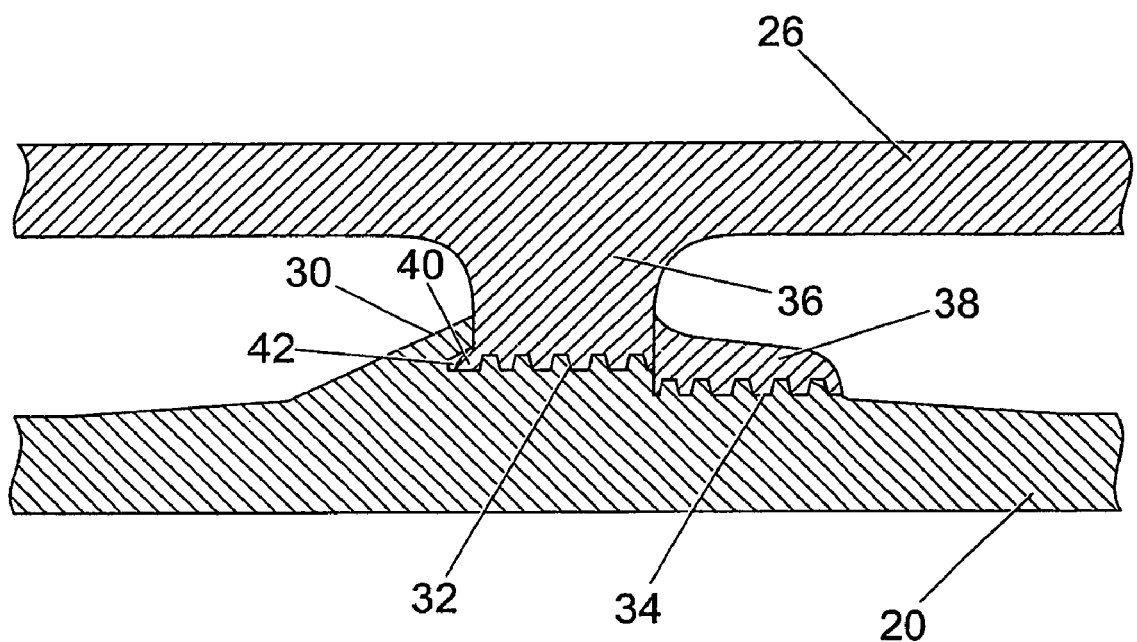
FIG. 3 is a fragmentary cross-sectional view, to a larger scale, of a modified embodiment.

FIG. 3 shows a modified embodiment in which the leading edge of the annular bulkhead 36 is formed as a sealing lip 40 which engages with an annular sealing groove 42 to form a metal-to-metal seal which makes the bulkhead 36 a fluid-tight barrier. The sealing of the connection, which is useful to provide water containment, can be achieved by various means such as by welding, the use of thread sealing products or by use of an o-ring.

The invention can also be applied to tubular members other than double-walled pipelines. For example, single-walled tubes can be joined together by means of a tubular external sleeve engaging with right-handed threads on mating ends of adjacent tubes, one of which is provided with a left-handed thread receiving a locking ring to secure the sleeve in place.

Although as described the primary engagement is by a right-handed thread and the locking ring is on a left-handed thread, this could of course be reversed.

It is also possible to invert the locations of the threaded components. In other words, in such a modification the annular wall is formed as a radial protrusion from the central tube and has first and second thread portions formed on its outer periphery. It would also be technically feasible, although less practicable in implementation, for the first and second thread portions to be formed internally on the outer tube and engaged by a thread on the outer periphery of the annular wall and by an externally-threaded locking ring.

The present invention provides a locking device in which the main threaded portion is prevented from being unscrewed. This allows size of the shear area to be maintained. In addition, the load will be shared between the two threaded connections (main and locking device) or between the main thread and the shoulders.

Other modifications and improvements may be made within the scope of the invention as defined by the claims.

What is claimed is:

1. A bulkhead assembly for a pipe-in-pipe system, the assembly comprising:
   an outer component and an inner component which can be screwed together along a first threaded portion, and
   a locking device,
   wherein the locking device comprises:
      a locking element and a second threaded portion wherein the locking element is screwed on the second threaded portion, the second threaded portion being threaded in a direction opposite to that of the first threaded portion and
      the assembly further comprises a radially extending abutment shoulder at an end of the first threaded portion on one of the components, the shoulder is positioned and configured to abut against a portion of the other component.

2. A bulkhead assembly according to claim 1, in which the first and second threaded portions are axially adjacent and are formed on an outer surface of an inner tubular member which forms the inner component.

3. A bulkhead assembly according to claim 2, in which the outer component comprises a tubular member having an inwardly directed annular bulkhead wall, said bulkhead wall having a radially inner surface formed with a thread for engaging said first threaded portion.

4. A bulkhead assembly according to claim 3, in which a leading edge of said inwardly directed bulkhead wall is formed with a sealing lip which is engageable with a sealing groove formed in the inner component to provide a fluid-tight seal.

5. A bulkhead assembly according to claim 4, in which the radially extending abutment shoulder is formed on the inner component.

* * * * *